United States Patent
Muto et al.

(10) Patent No.: US 7,051,709 B1
(45) Date of Patent: May 30, 2006

(54) CONTROL DEVICE FOR INTERNAL COMBUSTION ENGINE

(75) Inventors: Harufumi Muto, Nishikamo-gun (JP); Yuichiro Ido, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/261,605

(22) Filed: Oct. 31, 2005

(30) Foreign Application Priority Data

Nov. 26, 2004 (JP) ............................. 2004-341631

(51) Int. Cl.
*F02D 41/10* (2006.01)
*F02D 9/00* (2006.01)

(52) U.S. Cl. ...................................... 123/399; 123/684

(58) Field of Classification Search ................. 123/350, 123/399, 492, 684

See application file for complete search history.

(56) References Cited

U.S. PATENT DOCUMENTS

| 6,615,812 | B1 * | 9/2003 | Wild et al. ................... 123/683 |
| 6,662,640 | B1 * | 12/2003 | Yagi .......................... 73/118.2 |
| 6,868,327 | B1 * | 3/2005 | Muto ........................ 701/103 |

FOREIGN PATENT DOCUMENTS

| JP | A 5-65845 | 3/1993 |
| JP | A 2001-41095 | 2/2001 |

\* cited by examiner

*Primary Examiner*—Erick Solis
(74) *Attorney, Agent, or Firm*—Oliff & Berridge, PLC (57) ABSTRACT

A target value of an engine load ratio is calculated. A target throttle opening required for making the actual engine load ratio equal to the target engine load ratio is calculated on the basis of an intake pipe pressure which is a pressure in the intake passage downstream of the throttle valve. A convergent throttle opening, which is a throttle opening to which the actual throttle opening converges assuming that the target intake air amount is kept at the calculated target intake air amount, is calculated. A final target throttle opening is set to the target throttle opening when the engine transient operation is in process, and to the convergent throttle opening when the engine steady operation is in process. Then, the throttle valve is driven so that the actual throttle opening is made equal to the final target throttle valve.

11 Claims, 7 Drawing Sheets

CONTROL DEVICE FOR INTERNAL COMBUSTION ENGINE

BACKGROUND OF THE INVENTION

1. Field of the Invention

The present invention relates to a control device for an internal combustion engine.

2. Related Art

There is known an internal combustion engine in which a target intake air amount is calculated, a target throttle opening required for making the actual intake air amount equal to the target intake air amount is calculated, and the throttle valve is driven by an actuator so that the actual throttle opening is made equal to the target throttle opening (see Japanese Unexamined Patent Publication No. 5-65845).

When the engine is accelerated and thus the target intake air amount is increased stepwise, for example, the target throttle opening and, accordingly, the actual throttle opening increases suddenly and then decreases suddenly, after which it converges to a certain value, in order to quickly make the actual intake air amount equal to the target value. In other words, when the target intake air amount is increased or reduced, the throttle opening fluctuates or oscillates widely.

On the other hand, while the target intake air amount continuously increases or decreases when the engine is accelerated or decelerated, it increases and decreases alternately and repeatedly when the engine steady operation is in process. The above-mentioned fluctuation in the throttle opening will occur even when the target intake air amount is slightly increased or reduced. Accordingly, when the engine steady operation is in process, there may by a case in which the throttle opening fluctuates with a large amplitude. In addition, the durability of the throttle valve or the actuator may be deteriorated in a short time of period.

SUMMARY OF THE INVENTION

An object of the present invention is to provide a control device for an internal combustion engine capable of preventing the throttle opening from fluctuating when the engine steady operation is in process, to thereby prevent the durability of the throttle valve and the means for driving the throttle valve from being deteriorated in a short time of period.

According to the present invention, there is provided a control device for an internal combustion engine having an intake passage and a throttle valve arranged in the intake passage, the control device comprising: target air amount calculating means for calculating a target value of an intake air amount; target throttle opening calculating means for calculating a target throttle opening required for making the actual intake air amount equal to the target intake air amount; setting means for calculating a convergent throttle opening and setting a final target throttle opening to the convergent throttle opening when the engine steady operation is in process, the convergent throttle opening being a throttle opening to which the actual throttle opening converges assuming that the target intake air amount is kept at the target intake air amount calculated by the target air amount calculating means; and driving means for driving the throttle valve so that the actual throttle opening is made equal to the final target throttle opening.

The present invention may be more fully understood from the description of the preferred embodiments according to the invention as set forth below, together with the accompanying drawings.

DESCRIPTION OF THE PREFERRED EMBODIMENTS

Figure 1:
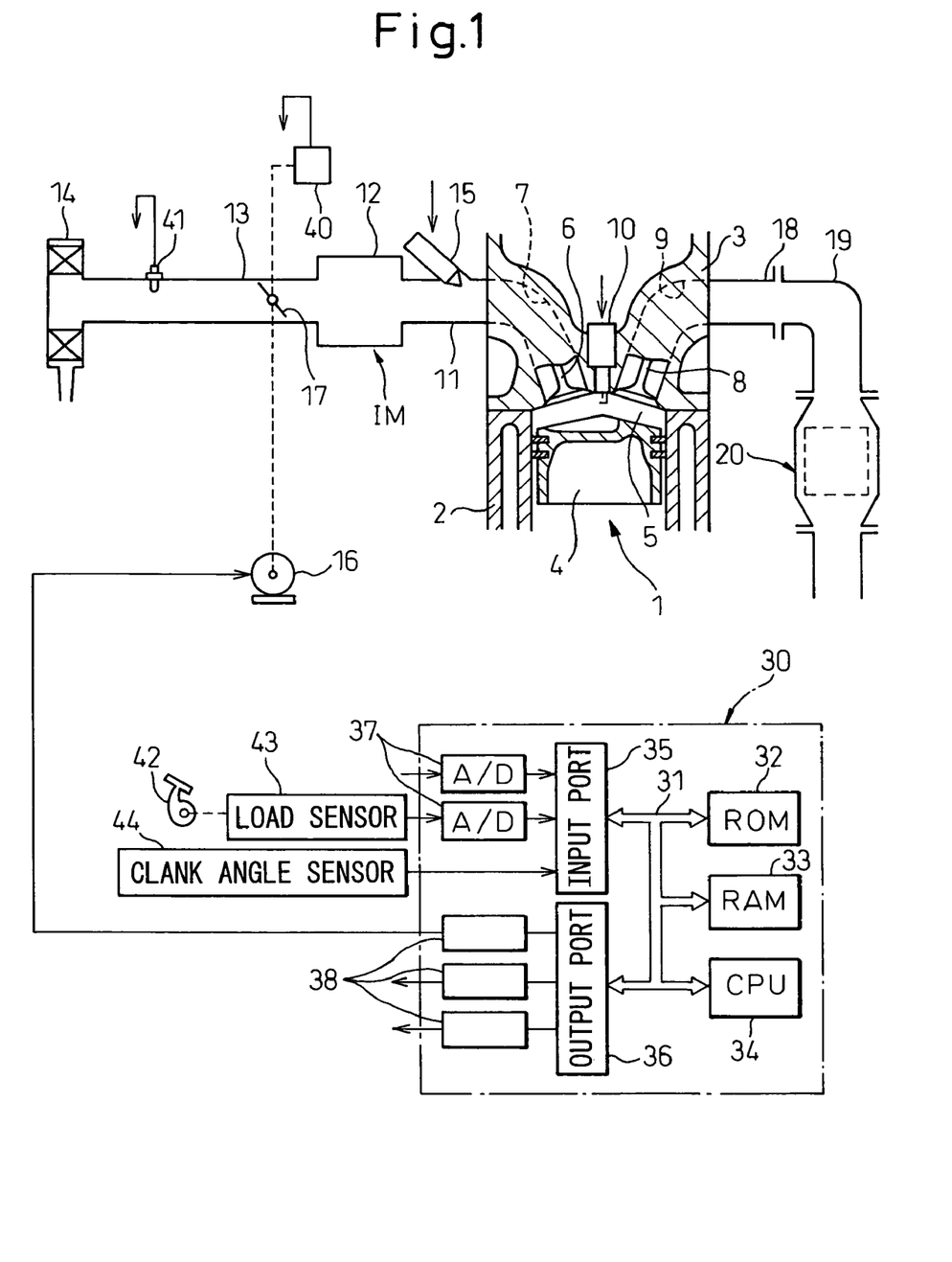
FIG. 1 shows an overall view of an internal combustion engine.

FIG. 1 shows a case in which the present invention is applied to an internal combustion engine of a spark-ignition-type. Alternatively, the present invention may also be applied to an internal combustion engine of a compression-ignition-type.

Referring to FIG. 1, the reference numeral 1 designates an engine body having four cylinders as an example, 2 designates a cylinder block, 3 designates a cylinder head, 4 designates a piston, 5 designates a combustion chamber, 6 designates intake valves, 7 designates intake ports, 8 designates exhaust valves, 9 designates exhaust ports and 10 designates a spark plug. The intake ports 7 are connected to a surge tank 12 through corresponding intake branches 11, and the surge tank 12 is connected to an air cleaner 14 through an intake duct 13. A fuel injector 15 is arranged in each intake branch 11, and a throttle valve 17 driven by a step motor 16 is arranged in the intake duct 13. Note that the intake duct 13 downstream of the throttle valve 17, the surge tank 12, the intake branches 11, and the intake ports 7 are referred to as an intake pipe IM, in the present specification.

On the other hand, the exhaust ports 9 are connected via an exhaust manifold 18 and an exhaust pipe 19 to a catalytic converter 20, and the catalytic converter 20 is communicated to the outside air via a muffler (not shown).

An electronic control unit 30 is constituted of a digital computer including a ROM (read-only memory) 32, a RAM (random access memory) 33, a CPU (microprocessor) 34, an input port 35 and an output port 36, which are connected to each other through a bidirectional bus 31. A throttle opening sensor 40 is attached to the throttle valve 17 for detecting an opening of the throttle valve 17, i.e., a throttle opening $\theta t$. An air flow meter 41 is attached to the intake duct 13 upstream of the throttle valve 17 for detecting a flow rate of intake air flowing through the intake passage of the engine. The air flow meter 41 has a built-in atmospheric temperature sensor for detecting the atmospheric temperature Ta (K). Also, an accelerator pedal 42 is connected with a load sensor 43 for detecting a depression ACC of the accelerator pedal 42. The depression ACC of the accelerator pedal 42 represents a required load. The output voltages of the sensors 40, 41 and 43 are input through corresponding A/D converters 37 to the input port 35. Further, the input port 35 is connected with a crank angle sensor 44 for generating an output pulse for each rotation of 30°, for example, of the crankshaft. CPU 34 calculates the engine speed NE on the basis of the output pulse from the crank angle sensor 44. On the other hand, the output port 36 is connected through corresponding drive circuits 38 to the spark plug 10, the fuel injectors 15, and the step motor 16, which are controlled on the basis of the output signals from the electronic control unit 30.

Figure 2:
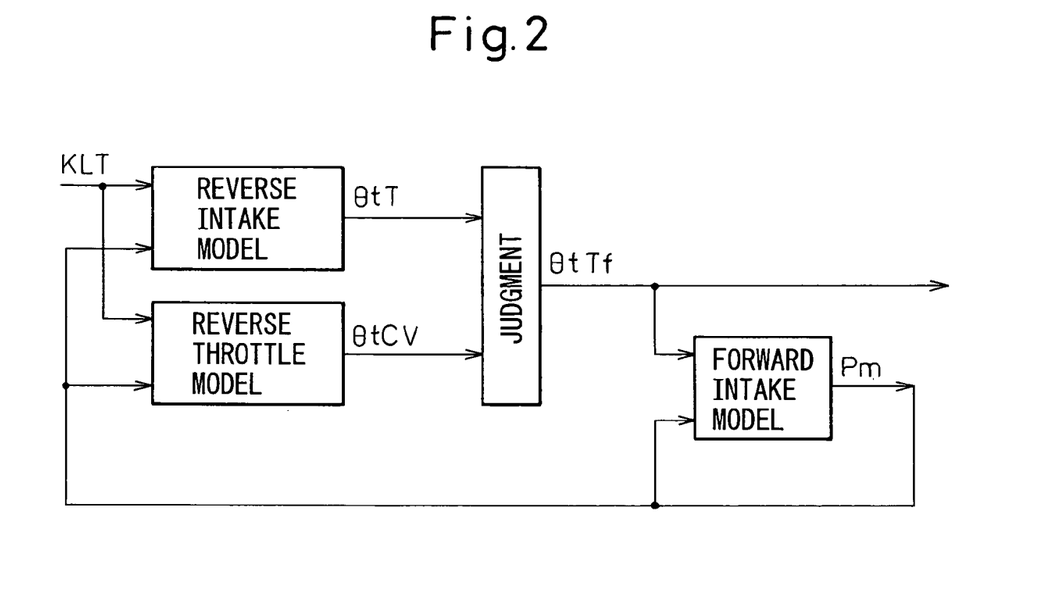
FIG. 2 shows a diagram for explaining an embodiment according to the present invention.

Referring to FIG. 2, in the embodiment according to the present invention, a target value KLT of an engine load ratio KL (%) representing an amount of intake air is first calculated. The target engine load ratio KLT may be calculated on the basis of the depression ACC of the accelerator pedal 42, and may be stored in the ROM 32 in advance, in the form of a map shown in FIG. 3. Then, a target throttle opening θtT, which is a throttle opening required to make the actual engine load ratio KL equal to the target value KLT, is calculated from the target engine load ratio KLT using a reverse intake model (explained later). Also, a convergent throttle opening θtCV, which is a throttle opening to which the actual throttle opening converges assuming that the target engine load ratio is kept at the calculated KLT, is calculated from the target engine load ratio KLT using a reverse throttle model (explained later).

After that, it is judged which is in process, the engine steady operation or the transient operation. For example, it is judged that the engine transient operation is in process when the changed amount or rate of the depression ACC of the accelerator pedal 42 is larger than a predetermined value, and that the engine steady operation is in process when the changed amount or rate of the depression ACC is smaller than the predetermined value. Then, a final target opening θtTf is set to the target throttle opening θtTf when the engine transient operation is in process, and is set to the convergent throttle opening θtCV when the engine steady operation is in process. After that, the throttle valve 17 is driven by the step motor 16 so that the actual throttle opening θt is made equal to the final target throttle opening θtTf.

Referring further to FIG. 2, if a pressure in the intake pipe IM is referred to as an intake pipe pressure Pm (kPa), the intake pipe pressure Pm realized when the actual throttle opening θt is made equal to the final target throttle opening θtTf is calculated from the final target opening θtTf using a forward intake model (explained later). The target engine load ratio KLT, the target throttle opening θtT, the convergent throttle opening θtCV, and the final target throttle opening θtTf are calculated repeatedly, and the target throttle opening θtT and the convergent throttle opening θtCV in the next processing cycle are calculated using the thus calculated intake pipe pressure Pm.

Figure 4A:
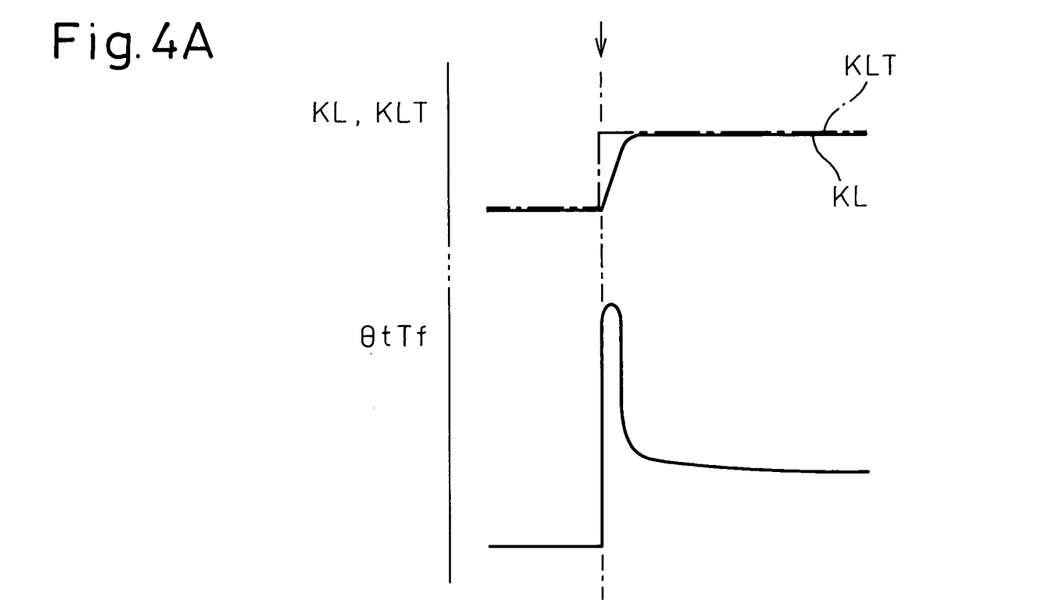
FIGS. 4A and 4B show time charts for explaining an embodiment according to the present invention.
Figure 4B:
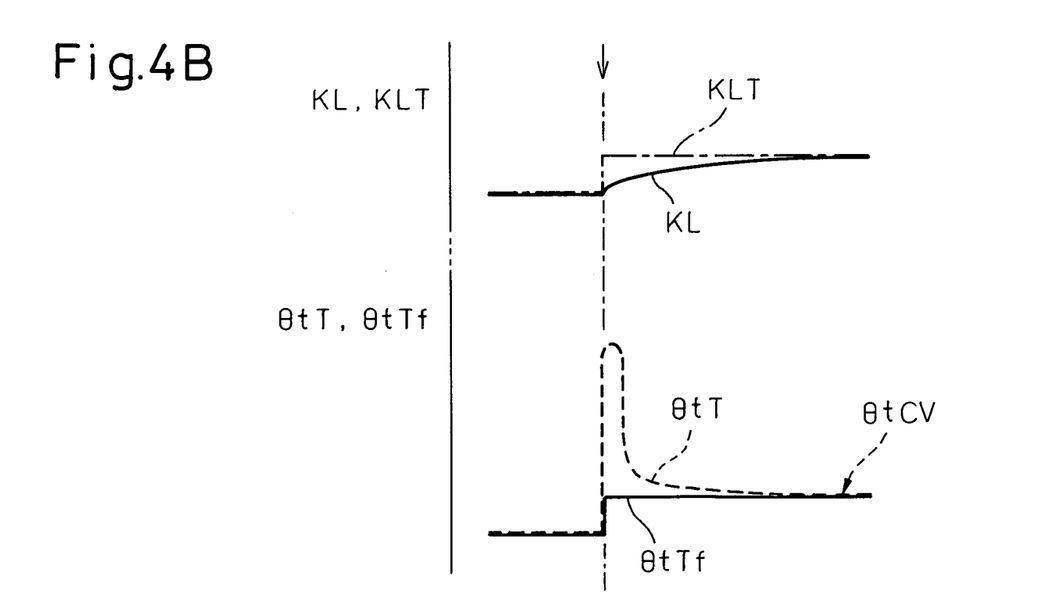

Next, the embodiment according to the present invention will be further explained taking as an example the case where the target engine load ratio KLT is increased and then kept constant, with reference to FIGS. 4A and 4B.

FIG. 4A shows a case where the engine transient operation is in process. When the target engine load ratio KLT increases widely as shown by an arrow in FIG. 4A, the final target throttle opening θtTf, which is equal to the target throttle opening θtT in this case, increases suddenly and then decreases suddenly, after which it converges to a certain value. The reason why the final target throttle opening θtTf behaves in this fashion is that the target throttle opening θtT calculated from the reverse intake model (see FIG. 2) is a throttle opening required for making the actual engine load ratio KL equal to the target ratio KLT by, for example, a single drive/operation of the throttle valve 17. As a result, the actual engine load ratio KL is quickly increased, and is quickly made equal to, and kept at, the target ratio KLT.

On the other hand, FIG. 4B shows a case where the engine steady operation is in process. When the target engine load ratio KLT increases slightly as shown by an arrow in FIG. 4B, the target throttle opening θtT increases suddenly and then decreases suddenly, after which it converges to the convergent throttle opening θtCV, as in the transition process. Therefore, if the final target throttle opening θtTf is set to the target throttle opening θtT and the actual throttle opening θt is controlled to be equal to the final target throttle opening θtTf, the throttle opening θt may undesirably fluctuate widely.

On the other hand, if the actual throttle opening θt is turned to and kept at the convergent throttle opening θtCV, the actual engine load ratio KL increases relatively slowly, and then converges to the target engine load ratio KLT. In this case, the throttle opening θt does not fluctuate widely.

So, in the embodiment according to the present invention, the final target opening θtTf is set to the convergent throttle opening θtCV when the engine steady operation is in process. In this case, it may take a relatively long time to make the actual engine load ratio KL equal to the target ratio KLT. However, this does not cause any problem because the target engine load ratio KLT changes slightly in the engine steady operation.

Note that, in the engine steady operation, the intake pipe pressure Pm is calculated on the basis of the final target throttle opening θtTf, rather than the target opening θtT. This ensures an accurate calculation of the intake pipe pressure Pm.

The above-mentioned engine load ratio KL is defined by the following equation (1), for example:

$$KL = \frac{Mc}{\frac{DSP}{NCYL} \cdot \rho astd} \cdot 100 \qquad (1)$$

where Mc represents an in-cylinder charged air amount (gram) which is an amount of air having been charged into each cylinder when the intake stroke is completed; DSP represents the displacement of the engine (liter); NCYL represents the number of cylinders; and ρastd represents density of air (=approximately 1.2 g/liter) at standard conditions (1 atm and 25° C.).

If a flow rate of air sucked from the intake pipe IM into the cylinder CYL is referred to as an in-cylinder intake air flow rate mc (gram/sec), the in-cylinder charged air amount Mc is expressed by the following equation (2):

$$Mc = mc \cdot tiv \qquad (2)$$

where tiv represents a time period (sec) required for each cylinder to conduct one intake stroke.

By replacing the coefficients together with kk, the engine load ratio KL can also be expressed by the following equation (3):

$$KL = kk \cdot mc \qquad (3)$$

On the other hand, the reverse intake model and the forward intake model are calculation models modeling the intake air flow. Next, the forward intake model will be explained.

Figure 5A:
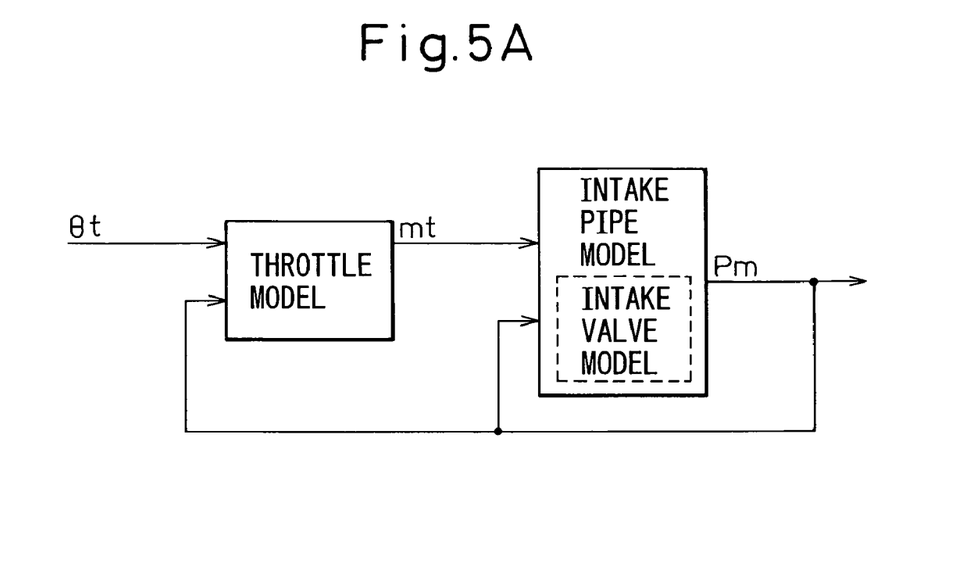
FIGS. 5A and 5B show diagrams for explaining a forward intake model and a reverse intake model, respectively.

In the embodiment according to the present invention, the forward intake model is constituted by a throttle model, an intake pipe model, and an intake valve model, as shown in FIG. 5A.

The throttle model will first be explained. The throttle model is a calculation model which models the intake air flow passing through the throttle valve 17. Note that a temperature of air in the intake pipe IM is referred to as an intake pipe temperature Tm (K).

Figure 6A:
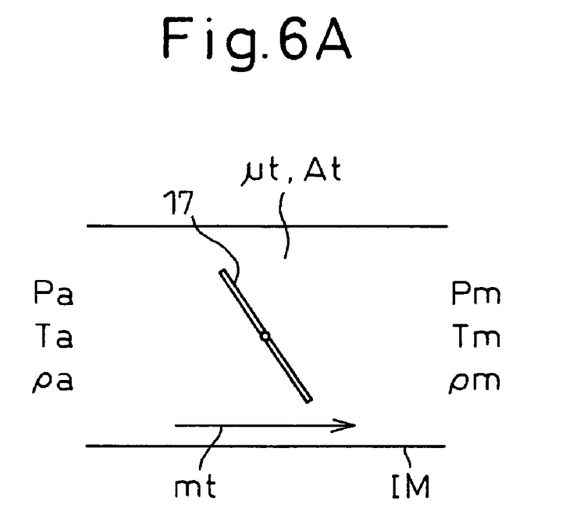
FIGS. 6A and 6B show diagrams for explaining each calculation model.

As shown in FIG. 6A, assuming that a pressure and a temperature upstream of the throttle valve 17 are the atmospheric pressure Pa and the atmospheric temperature Ta, respectively, and that a pressure and a temperature downstream of the throttle valve 17 are the intake pipe pressure Pm and the intake pipe temperature Tm, respectively, a throttle valve passing-through air flow rate mt (gram/sec), which is a flow rate of air passing through the throttle valve 17, is expressed by the following equation (4), using the linear velocity vt (m/sec) of air passing through the throttle valve 17:

$$mt = \mu t \cdot At \cdot vt \cdot \rho m \qquad (4)$$

where $\mu t$ represents a flow coefficient at the throttle valve 17, At represents an opening area (m$^2$) of the throttle valve 17, and $\rho m$ represents density (kg/m$^3$) of air downstream of the throttle valve 17 or in the intake pipe IM. Note that the flow coefficient $\mu t$ and the opening area At are functions of the throttle opening $\theta t$, respectively.

Further, the energy conservation law regarding air upstream and downstream of the throttle valve 17 is expressed by the following equation (5):

$$\frac{v^2}{2} + Cp \cdot Tm = Cp \cdot Ta \qquad (5)$$

where Cp represents the specific heat at a constant air pressure.

Furthermore, considering that, at infinity upstream of the throttle valve 17, the cross sectional area of the intake pipe IM is infinitely large and the air flow rate is zero, the momentum conservation law regarding air upstream and downstream the throttle valve 17 is expressed by the following equation (6):

$$\rho m \cdot v^2 = Pa - Pm \qquad (6)$$

Accordingly, the throttle valve passing-through air flow rate mt is expressed by the following equation (7) from the state equation at the upstream of the throttle valve 17 (Pa=$\rho a \cdot R \cdot Ta$, where $\rho a$ represents density (kg/m$^3$) of air at the upstream of the throttle valve 17 or in the atmosphere, and R represents the gas constant), the state equation at the downstream of the throttle valve 17 (Pm=$\rho m \cdot R \cdot Tm$), and the above-mentioned equations (4), (5), and (6):

$$mt = \mu A(\theta t) \cdot \frac{Pa}{\sqrt{R \cdot Ta}} \cdot \Phi\left(\frac{Pm}{Pa}\right) \qquad (7)$$

$$\Phi\left(\frac{Pm}{Pa}\right) =$$

Figure 7:
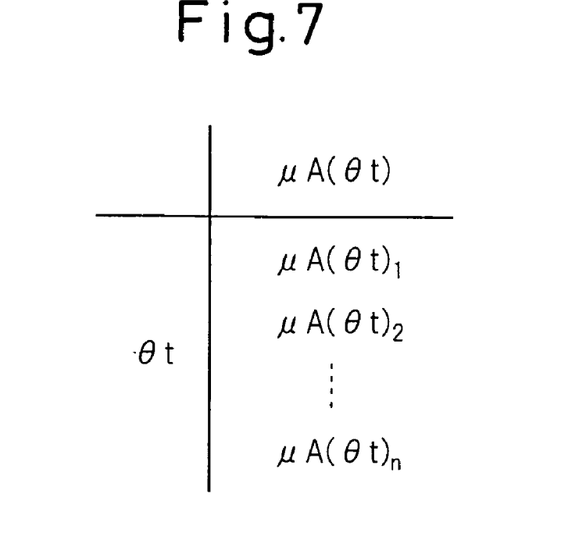
FIG. 7 shows a map illustrating $\mu A(\theta t)$.

-continued $$\begin{cases} \sqrt{\frac{\kappa}{2 \cdot (\kappa+1)}} & \cdots \frac{Pm}{Pa} \leq \frac{1}{\kappa+1} \\ \sqrt{\left\{\frac{\kappa-1}{2 \cdot \kappa} \cdot \left(1 - \frac{Pm}{Pa}\right) + \frac{Pm}{Pa}\right\} \cdot \left(1 - \frac{Pm}{Pa}\right)} & \cdots \frac{Pm}{Pa} > \frac{1}{\kappa+1} \end{cases}$$

where $\mu A(\theta t)$ represents a function of the throttle opening $\theta t$ expressing the flow coefficient $\mu t$ and opening area At together. The function $\mu A(\theta t)$ is obtained from experiments in advance, and is stored in the ROM 32 in the form of a map as shown in FIG. 7.

The throttle valve passing-through air flow rate mt calculated from the equation (7) represents a throttle valve passing-through air flow rate realized when the intake pipe pressure is equal to Pm and, at this time, the throttle opening is turned to $\theta t$.

Next, the intake pipe model will be explained. The intake pipe model is a calculation model modeling the intake air flow in the intake pipe IM.

Figure 6B:
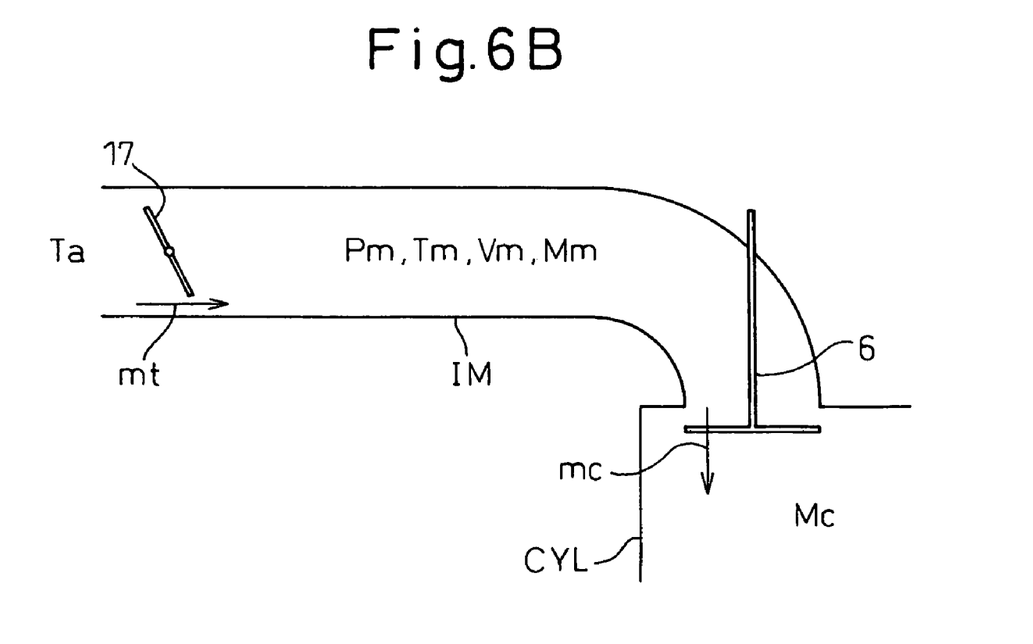

The intake pipe model of the embodiment according to the present invention focuses on the mass conservation law and the energy conservation law regarding the intake pipe IM. Specifically, the flow rate of air entering the intake pipe IM is equal to the throttle valve passing-through air flow rate mt and the flow rate of air exiting from the intake pipe IM is equal to the in-cylinder intake air flow rate mc, as shown in FIG. 6B, and therefore, the mass conservation law and the energy conservation law regarding the intake pipe IM are expressed by the following equations (8) and (9), respectively:

$$\frac{dMm}{dt} = mt - mc \qquad (8)$$

$$\frac{d(Mm \cdot Cv \cdot Tm)}{dt} = Cp \cdot mt \cdot Ta - Cp \cdot mc \cdot Tm \qquad (9)$$

where Mm represents an amount of air (gram) existing in the intake pipe IM, t represents time, Vm represents a volume (m$^3$) of the intake pipe IM, and Cv represents the specific heat at constant volume of air.

The equations (8) and (9) can be rewritten to the following equations (10) and (11), respectively, using the state equation (Pm·Vm=Mm·R·Tm), Mayer's relation (Cp=Cv+R), the specific heat ratio K (=Cp/Cv), and a pressure-temperature ratio PBYT (=Pm/Tm):

$$\frac{dPBYT}{dt} = \frac{R}{Vm} \cdot (mt - mc) \qquad (10)$$

$$\frac{dPm}{dt} = \kappa \cdot \frac{R}{Vm} \cdot (mt \cdot Ta - mc \cdot Tm) \qquad (11)$$

In the actual calculation, the equations (10) and (11) are expressed as in the equations (12) and (13), respectively, using the time interval of calculation $\Delta t$ and a parameter i expressing the number of calculation cycle:

$$PBYT(i) = PBYT(i-1) + \Delta t \cdot \frac{R}{Vm} \cdot (mt(i-1) - mc(i-1)) \quad (12)$$

$$Pm(i) = Pm(i-1) + \Delta t \cdot \kappa \cdot \frac{R}{Vm} \cdot (mt(i-1) \cdot Ta - mc(i-1) \cdot Tm(i-1)) \quad (13)$$

Further, the intake pipe temperature Tm is calculated from the following equation (14):

$$Tm(i) = \frac{Pm(i)}{PBYT(i)} \quad (14)$$

The intake pipe pressure Pm(i) calculated from the equation (13) represents an intake pipe pressure realized when the intake pipe pressure and temperature are equal to Pm(i−1) and Tm(i−1) and, at this time, air enters in the intake pipe IM by mt(i−1) and exits from the intake pipe IM by mc (i−1).

Next, the intake valve model will be explained. The intake valve model is a calculation model modeling the intake air flow passing through the intake valve 6.

Figure 8A:
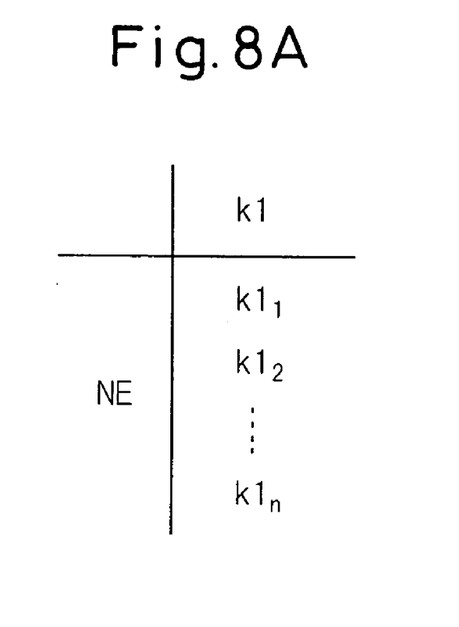
FIGS. 8A and 8B show maps illustrating k1 and k2, respectively.
Figure 8B:
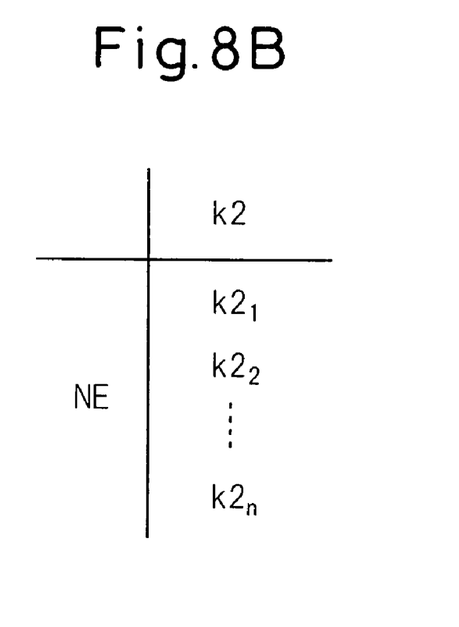

It has been experimentally and theoretically proved that there is a linear relationship between the in-cylinder intake air flow rate mc and the intake pipe pressure Pm or, more accurately, the intake pipe pressure Pm at the closing timing of the intake valve 6. The intake valve model of the embodiment according to the present invention focuses on this relationship and, therefore, the in-cylinder intake air flow rate mc is expressed by the following equation (15):

$$mc = k1 \cdot Pm - k2 \quad (15)$$

where k1 and k2 are constants set in accordance with the engine operating condition such as the engine speed NE, and are stored in the ROM 32 in advance in the form of maps shown in FIGS. 8A and 8B, respectively.

The in-cylinder intake air flow rate mc calculated from the equation (15) represents an in-cylinder intake air flow rate realized when the intake pipe pressure is equal to Pm.

Accordingly, the intake pipe pressure Pm, calculated from the equation (13) using the throttle valve passing-through air flow rate mt calculated from the equation (7) while (θt, Pm) in the equation (7) are replaced with (θtTf, Pmo), the in-cylinder intake air flow rate mc calculated from the equation (15), and the intake pipe temperature Tm calculated from the equations (12) and (14), represents an intake pipe pressure realized when the actual throttle opening θt is made equal to the final target throttle opening θtTf. Note that Pmo represents an intake pipe pressure Pm in the previous calculation cycle.

Figure 5B:
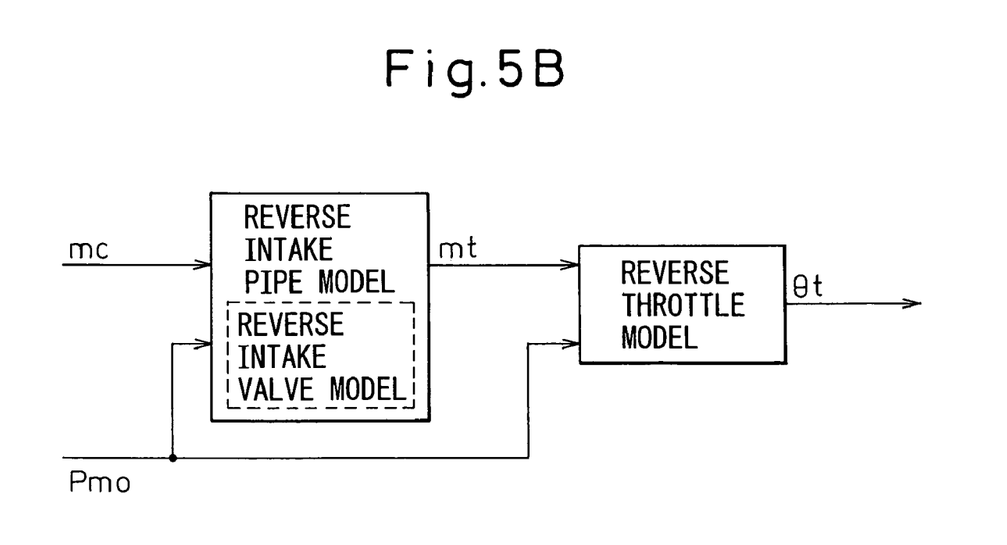

Next, the reverse intake model will be explained. In the embodiment according to the present invention, the reverse intake model is constituted by a reverse throttle model, a reverse intake pipe model, and a reverse intake valve model, as shown in FIG. 5B. The reverse throttle model, the reverse intake pipe model, and the reverse intake valve model are for performing calculations in reverse direction in the throttle model, the intake pipe model, and the intake valve model, respectively.

The reverse intake valve model will first be explained. In the reverse intake valve model, the intake pipe pressure Pm when the in-cylinder intake air flow rate is equal to mc is expressed by the following equation (16) derived from the equation (15):

$$Pm = \frac{mc + k2}{k1} \quad (16)$$

Next, the reverse intake pipe model will be explained. Assuming that an intake pipe pressure, realized when the intake pipe pressure and temperature are equal to Pmo and Tmo and, at this time, air enters in the intake pipe IM by mt and exits from the intake pipe IM by mc, is equal to Pm, the throttle valve passing-through air flow rate mt is expressed by the following equation (17) derived from the equation (13):

$$mt = \frac{1}{Ta} \cdot \left\{ (Pm - Pmo) \cdot \frac{Vm}{\Delta t \cdot \kappa \cdot R} + mc \cdot Tmo \right\} \quad (17)$$

Next, the reverse throttle model will be explained. The throttle opening θt when the throttle valve passing-through air flow rate is equal to mt is expressed by the following equation (18) derived from the equation (7):

$$\theta t = \mu A^{-1} \left( \frac{mt}{\frac{Pa}{\sqrt{R \cdot Ta}} \cdot \Phi\left(\frac{Pmo}{Pa}\right)} \right) \quad (18)$$

where $\mu A^{-1}$ represents an inverse function of μA.

Accordingly, the intake pipe pressure Pm, calculated from the equation (16) while mt in the equation (16) is replaced with mcT, represents a target value PmT of the intake pipe pressure Pm, where mcT represents a target value of the in-cylinder intake air flow rate mc corresponding to the target engine load ratio KLT. Further, the throttle valve passing-through air flow rate mt, calculated from the equation (17) while Pm in the equation (17) is replaced with PmT, represents a target value mtT of the throttle valve passing-through air flow rate mt. Furthermore, the throttle opening θt, calculated from the equation (18) while mt in the equation (18) is replaced with mtT, represents the target throttle opening θtT required for making the actual engine load ratio KL equal to the target engine load ratio KLT.

The target in-cylinder intake air flow rate mcT may be calculated from the following equation (19) derived from the equation (3):

$$mcT = \frac{KLT}{kk} \quad (19)$$

On the other hand, when the actual engine load ratio KL converges to, and is kept at, the target ratio KLT, the throttle valve passing-through air flow rate mt is equal to the in-cylinder intake air flow rate mc or the target in-cylinder intake air flow rate mcT. In addition, a convergent intake pipe pressure PmCV, which is an intake pipe pressure Pm at this time, is substantially constant, and is expressed by the following equation (20) derived from the equation (16):

$$PmCV = \frac{mcT + k2}{k1} \quad (20)$$

Accordingly, the throttle opening θt, calculated from the equation (18) while (mt, Pmo) are replaced with (mcT, PmCV), represents the convergent throttle opening θtCV.

Figure 9:
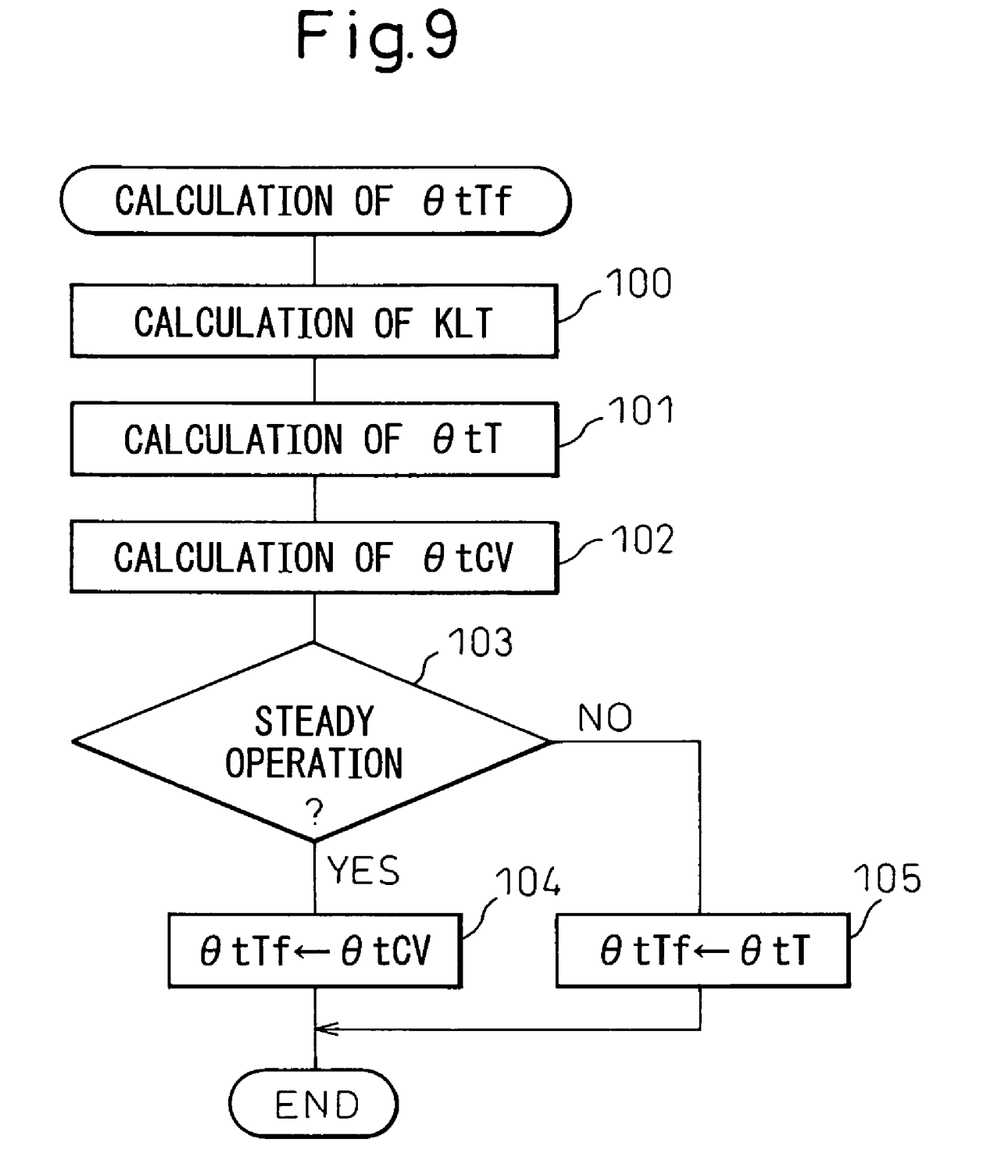
FIG. 9 shows a flowchart illustrating a routine for calculating a final target throttle opening $\theta tTf$, according to an embodiment of the present invention.

FIG. 9 shows a calculation routine of the final target throttle opening θtTf according to the embodiment of the present invention. This routine is executed by an interruption every predetermined time.

Figure 3:
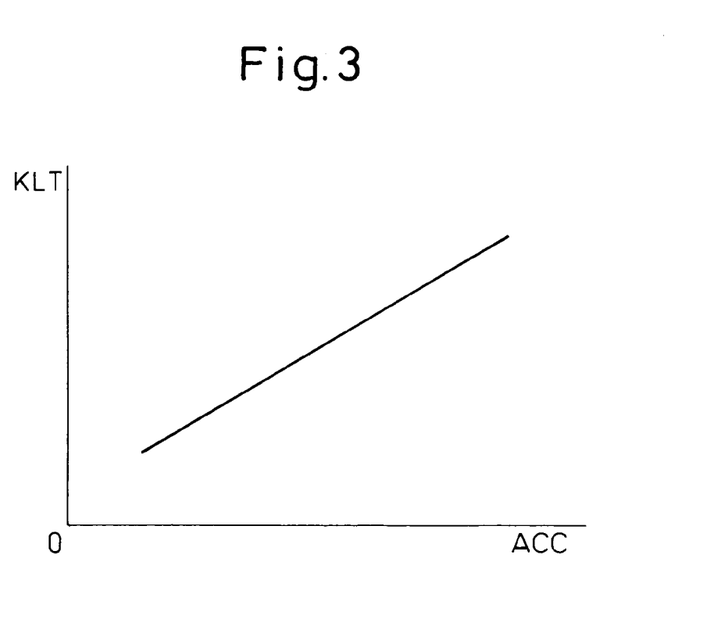
FIG. 3 shows a map illustrating KLT.

Referring to FIG. 9, in step 100, the target engine load ratio KLT is calculated from the map shown in FIG. 3. In the following step 101, the target throttle opening θtT is calculated using the reverse intake model. In the following step 102, the convergent throttle opening θtCV is calculated. In the following step 103, it is judged whether the engine steady operation is in process. If the engine steady operation is in process, the routine goes to step 104 where the final target throttle opening θtTf is set to the convergent throttle opening θtCV. Then, the processing cycle is ended. In contrast, if the engine transient operation is in process, the routine goes from step 103 to step 105 where the final target throttle opening θtTf is set to the target throttle opening θtT. Then, the processing cycle is ended.

Note that the convergent throttle opening θtCV may be calculated only when it is judged that the engine steady operation is in process.

According to the present invention, it is possible to provide a control device for an internal combustion engine capable of preventing the throttle opening from fluctuating when the engine steady operation is in process, to thereby prevent the durability of the throttle valve and the means for driving the throttle valve from being deteriorated in a short time of period.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A control device for an internal combustion engine having an intake passage and a throttle valve arranged in the intake passage, the control device comprising:
    target air amount calculating means for calculating a target value of an intake air amount;
    target throttle opening calculating means for calculating a target throttle opening required for making the actual intake air amount equal to the target intake air amount;
    setting means for calculating a convergent throttle opening and setting a final target throttle opening to the convergent throttle opening when the engine steady operation is in process, the convergent throttle opening being a throttle opening to which the actual throttle opening converges assuming that the target intake air amount is kept at the target intake air amount calculated by the target air amount calculating means; and
    driving means for driving the throttle valve so that the actual throttle opening is made equal to the final target throttle opening.

2. A control device for an internal combustion engine as described in claim 1, wherein the setting means sets the final target throttle opening to the target throttle opening calculated by the target throttle opening calculating means when the engine transient operation is in process.

3. A control device for an internal combustion engine as described in claim 1, further comprising estimating means for repeatedly estimating an intake pipe pressure, which is a pressure in the intake passage downstream of the throttle valve, on the basis of the final target throttle opening.

4. A control device for an internal combustion engine as described in claim 3, wherein the target throttle opening calculating means calculates the target throttle opening on the basis of the previously-estimated intake pipe pressure and the target intake air amount.

5. A control device for an internal combustion engine as described in claim 4, wherein the target throttle opening calculating means calculates:
    a target value of an in-cylinder intake air flow rate, which is a flow rate of air sucked from the intake passage into the cylinder, on the basis of the target intake air amount;
    a target value of the intake pipe pressure on the basis of the calculated target in-cylinder intake air flow rate;
    a target value of a throttle valve passing-through air flow rate, which is an air flow rate passing through the throttle valve, on the basis of the previously-estimated intake pipe pressure and the calculated target intake pipe pressure; and
    the target throttle opening on the basis of the previously-estimated intake pipe pressure and the calculated target throttle valve passing-through air flow.

6. A control device for an internal combustion engine as described in claim 3, wherein the setting means calculates the convergent throttle opening on the basis of the previously-estimated intake pipe pressure and the target intake air amount.

7. A control device for an internal combustion engine as described in claim 6, wherein the setting means calculates:
    a target value of an in-cylinder intake air flow rate, which is a flow rate of air sucked from the intake passage into the cylinder, on the basis of the target intake air amount;
    a convergent intake pipe pressure, which is the intake pipe pressure realized when the actual intake air amount converges to the target intake air amount, on the basis of the calculated target in-cylinder intake air flow rate; and
    the convergent throttle opening on the basis of the previously-estimated intake pipe pressure and the calculated target in-cylinder intake air flow rate.

8. A control device for an internal combustion engine as described in claim 3, wherein the estimating means estimates:
    a throttle valve passing-through air flow rate, which is an air flow rate passing through the throttle valve, on the basis of the previously-estimated intake pipe pressure and the final target throttle opening;
    an in-cylinder intake air flow rate, which is a flow rate of air sucked from the intake passage into the cylinder, on the basis of the previously-estimated intake pipe pressure; and
    the new intake pipe pressure on the basis of the previously-estimated intake pipe pressure, the estimated throttle valve passing-through air flow rate, and the estimated in-cylinder intake air flow rate.

9. A control device for an internal combustion engine as described in claim 1, wherein the setting means judges that the engine transient operation is in process when the changed amount or rate of a required engine load is larger than a predetermined value, and that the engine steady operation is in process when the changed amount or rate of the required engine load is smaller than the predetermined value.

10. A control device for an internal combustion engine as described in claim 1, wherein the target air amount calculating means calculates the target intake air amount on the basis of a required engine load.

11. A control device for an internal combustion engine as described in claim 1, wherein the driving means comprises a step motor.

* * * * *